Figure 1:
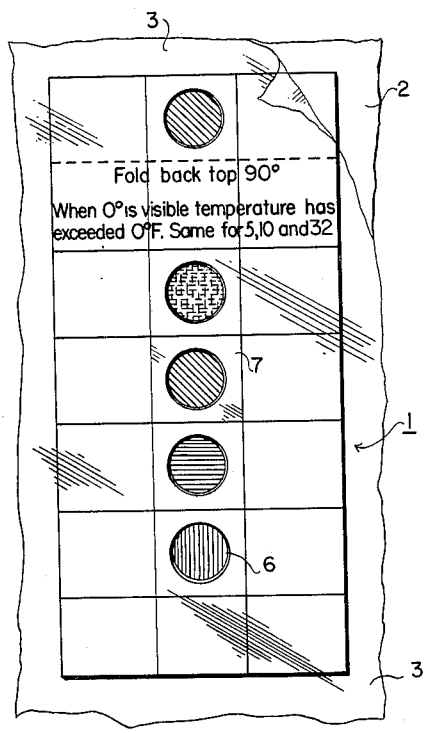

July 31, 1962  W. M. LANIER  3,047,405
INDICATORS
Filed Jan. 25, 1960

INVENTOR.
WILLIAM M. LANIER
BY
*Alexander & Dowell*
ATTORNEYS.

_United States Patent Office_

3,047,405
Patented July 31, 1962

3,047,405
INDICATORS
William M. Lanier, 1317 Seaton Lane, Falls Church, Va.
Filed Jan. 25, 1960, Ser. No. 4,524
5 Claims. (Cl. 99—192)

This invention relates to indicators for visually indicating the temperature of frozen comestibles.

A wide and general practice in the food industry is to package perishable foods in their initial fresh condition without sterilization by deep freezing and to retain them in such frozen condition until ultimate consumption. Such a system of packaging presents many advantages including, retention of original flavor and freshness, elimination of chemical preservatives, cheaper packaging as compared to metal and glass containers and the like. In most cases quick frozen food which has been thawed tends to spoil more rapidly than the unfrozen fresh counterparts. It is well known by those skilled in the art that if the temperature of a perishable frozen food product such as fish or meat is elevated to or near its thawing point and is maintained at such point for a period of time theretofore dormant microorganisms may become activated with ensuing adverse effects on the quality of the product including dangerous spoilage. Again, as in the case of certain fruits and vegetables elevation of the temperature to the thawing point followed by refreezing can adversely affect the texture, flavor and/or color of such comestibles.

It is now being recognized by those engaged in the frozen food industry and those concerned with public health that it is most desirable to provide with the packaged frozen foods a device or means which indicates the thermal history of a food package from the time of transport from the origin packing plant to the ultimate consumer to the end that the purchaser may be appraised of the fact that it has not been altered undesirably in quality. It is also generally recognized that such indicating means should be irreversible in action, that is to say it should indicate that the product, at some time prior to purchase, had attained a selected elevated temperature even though it was subsequently reduced in temperature or refrozen.

As noted much of the frozen food products which are presently marketed are quick-frozen in the fresh, unsterilized state. Many of the microorganisms normally associated with food products such as certain enzymes and proteolytic bacteria are somewhat thermodural in character and may be active at the classically accepted freezing temperature of 32° F. Food products, especially perishable products, shell-fish, shrimp, fish and meats are cooled well below their freezing point to insure inactivation of such microorganisms and also to store or accumulate in the frozen product a substantial quantum of latent cold to compensate for heat acquired during transportation and marketing of the product. Such deeply frozen products may be subjected to higher ambient temperatures without thawing than those that are initially frozen at a more elevated temperature, i.e. with less "deep" freezing. To eliminate the danger of microbial action and to build up the cold capacity of the product it is generally accepted that frozen foods in transit and storage should be retained at a minimum temperature of between −10° F. and +5° F. The desirability of a temperature indicator for frozen foods has been recognized and many indicators have been proposed. Generally considered these devices involve, the utilization of colorimetric changes in juxtaposed indicator media upon liquefaction of a frozen electrolyte, the activation of color media by change in pH resulting from enzymatic activity at the undesirable elevated temperature, the utilization of frangible capsules containing a frozen electrolyte which capsules are encase in a slowly soluble outer capsule appressed to a litmus indicator. These several methods present their individual disadvantages and for the most part require the use of relatively complicated structures to achieve the result sought, are relatively expensive to produce and usually are not easily amenable to incorporation in or association with a frozen food package. Despite the very many prior suggestions there remains a real need for a simple, effective and reliable method and means for visually indicating the thermal history of frozen comestibles to clearly indicate to a distributor or consumer the fact that the product has not at any time attained such an elevated temperature as would adversely affect its quality. The desirable criteria for such an indicating means include: economy and ease of manufacture of the indicating device; ready amenability to its incorporation in or association with a carton or package of frozen food; clear indication of a temperature, and preferably selected stages of temperature which the packaged product might attain above the desirable low temperature at which the product should be retained and a controlled or delayed action of the indicator such that it is not activated by a brief and transitory elevation of the surface temperature of the frozen food package.

A primary objective of the invention is to devise a telltale or temperature indicator which abundantly satisfies the enumerated criteria. Another objective is to provide a temperature indicating unit of eminently simple structure and design which is readily embodied in a frozen food package without any significant change in current wrapping and packaging techniques. Yet another objective is to provide a unitary indicating device which indicates the attainment of a selected temperature by dual indications.

Figure 2:
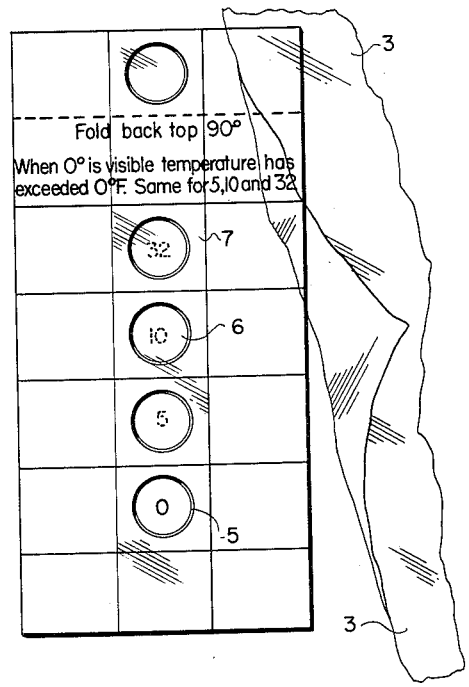
Figure 3:
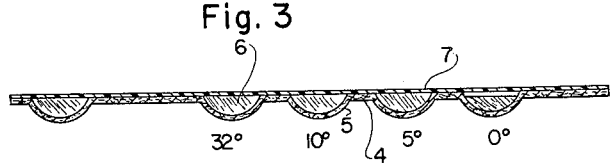

In order to insure a ready comprehension of the invention a preferred illustrative embodiment is shown in the accompanying drawings in which:

FIG. 1 is a top plan view of the indicating device as incorporated in a package of frozen food; FIG. 2 is a similar view as thawed; FIG. 3 is a cross-sectional view taken on line 3—3 of FIG. 1.

In the embodiment shown in the drawing the frozen food product is contained within a package or receptacle 1 which may comprise a waxed carton 2 which is wrapped in a transparent or translucent water-proof sheet material 3. As shown in FIG. 2 the improved temperature indicating device 4 is conveniently placed between the wrapper 3 and carton 2 during the packaging operation. The indicator comprises essentially a flat strip of cellulosic material of selected water absorptive characteristics and is formed with integral shallow recesses or depressions 5 having the printed indicia denoting a given temperature, for example 0° F., 5° F., 10° F. and 32° F. as shown. The series of recesses is designed to contain a series of pellets 6, each being made up of a solution having a freezing point corresponding with the particular temperature indicia printed in its receiving recess. Each such pellet is distinctively colored and is differentially colored from any of the other pellets of the series so that the range of different colors characterizes the stages in the range of temperature which is selected for indication, for example, as shown in FIG. 1, the 32° F. recess may contain a yellow colored pellet, the 10° F. recess a green, the 5° F. recess a blue and the 0° F. recess a red. The pellets, as shown conform to the shape of the recesses and are retained therein by means of the transparent adhesive strip 7, such as a strip of "Scotch tape" which overlies the pellets and adheres to the sheet 4 along the periphery of the strip.

The formed units or pellets may be made up of aqueous solutions of non-toxic alcohols such as mono, di, and trihydric alcohols or other suitable non-toxic, water soluble freezing point depressants. Di-hydric alcohols and glycerine are the preferred depressants because, among other things the higher viscosity of their aqueous solution is a factor of importance in the functioning of the novel indicator. As is known the freezing of the several solutions which constitute the ultimate pellets may be established at any desired point in the temperature range to be indicated by adjusting the percentage of the depressant in the aqueous solution. Thus in the case of glycerine the freezing point of solutions may be established at approximately 0° F. to 10° F. by employing aqueous solutions containing from about 40.5% to 29.5% of glycerine.

As noted previously the several solutions of selected freezing points are differentially dyed or colored. A feature of the invention is the control of the concentration of the particular dye in each of the solutions such that the frozen pellet has a color density which renders the pellet, as such, opaque to completely mask the underlying printed indicia in the recess but when such pellets are liquefied and the liquefied solution is absorbed in and diffuses through and tints the adjacent area of sheet 4. The absorbed color being of insufficient density and opacity to mask such indicia, allows clear vision thereof.

The sheet 4, which is white or colorless serves both as a carrier for the pellets and as an absorption medium for a pellet which is liquefied to thus directly indicate a given temperature. Such sheet, in effect gives a dual indication of the fact that the packaged food has been retained at a given temperature for an appreciable time, namely by unmasking of the indicia underlying the pellet and by the distinctive coloration of a substantial segregated area of the sheet adjacent the unmasked recess. A purchaser is thus made immediately aware of the desirable or undesirable character of the product.

As indicated previously an object of the invention is to provide an indicator which visually discloses not only the fact at some time the packaged food has reached a certain elevated temperature but also has been retained at such temperature for some appreciable time. In some circumstances a package of frozen food might be subjected for a very brief period to such ambient temperature as would cause superficial thawing and might be then quickly refrozen. In such circumstances there is no practical danger of spoilage. However when such thawing temperature is reached and is maintained for an appreciable period of time the spoilage may result. A feature of the invention is to correlate such time-temperature relationship to provide a suitable visual indication. For this purpose the properties of the sheet 4 are such that it is characterized by a controlled relatively slow rate of absorption and lateral diffusion in the sheet of the liquid emanating from the pellet so that if perchance a pellet were temporarily liquefied and then quickly thereafter was refrozen the diffusion of the colored liquid would not be sufficient to cause unmasking of the underlying indicia.

Such slow or reduced absorption and migration properties in the sheet may be established in any desired manner. Thus the material from which the sheet is made may comprise a selected, relatively low percentage of the usual highly absorptive cellulose bleached sulfite and sulfate fibers and a higher or preponderant amount of less absorptive bleached or unbleached kraft fibers. Again the material may comprise selected percentages of absorptive cellulosic fibers and synthetic non-absorptive fibers such that the capillarity of the sheet as a whole is reduced and migratory diffusion of liquid from the melted pellet is retarded to a selected degree. Yet again a sheet comprised wholly or partly of cellulosic fibers may be treated to reduce the absorption of the cellulosic fibers as, for example by saturating such sheet with a solution containing a selected percentage of a soluble low methoxyl pectinate, such as sodium pectinate then treating the sheet with a solution of calcium chloride to form insoluble calcium pectinate in situ in an amount sufficient to reduce the absorption to a chosen degree and thus insure corresponding delayed diffusion of the liquefied pellet. The diffusion rate of liquid through the sheet may also be modified within limits by varying the porosity or density of the sheet as by the application of controlled calendering on the sheet.

The pellets 6 may be incorporated in or associated with the sheet 4 in any desired manner; thus the pellets employed may be preformed by freezing or may be cut from a frozen slab and inserted in the recesses and retained therein by application of the adhesive strip 7. If desired the pellets may be formed in situ in the recesses by admitting chilled solutions into the depressions of the recesses and then quickly freezing the solution to the solid phase before any appreciable migration of liquid takes place. As will be appreciated solutions of high viscosity will tend to diffuse through the sheet at a lower rate than more mobile solutions and hence it is within the concept of the invention to incorporate compatible thickening or viscosity-increasing agents in the colored aqueous solution of the depressant.

Since the entire indicating device composed of the sheet 4, pellets 5 and retaining strip 7 constitutes essentially a flat unit it may readily be embodied or incorporated in the package either on the face side or end portion at any appropriate stage in the packaging operation adding nothing to the bulk of the package or requiring any change in the conformation or design of existing packages. It is apparent that while the indicator device has been described in association with individual packages of frozen foods it may similarly be associated directly with a carton containing a number of such individual packages.

The novel indicator is as cheap as it is uncomplicated and effective, involving in its fabrication only flat sheet stock, inexpensive freezing point depressants, like the glycols and glycerol, inexpensive viscosity-increasing agents like polyvinyl alcohol and relatively low concentrations of readily available dyes. Obviously the structural nature of the indicator lends itself ideally to automation and continuous production. The pellet-forming solutions are readily meterable and the flat paper stock of the indicator can be processed in continuous sheet form on a continuous conveyor. The pellets can be automatically inserted and/or formed in situ, the adhesive strips can be continuously and automatically applied and the sheet can be continuously and automatically cut into individual units which can be fed continuously to the packaging operation.

While a preferred embodiment of the invention has been described it will be understood that this is given to illustrate the underlying principles of the invention and not to limit its useful scope.

I claim:

1. A delayed-action visual indicator for indicating a rise in temperature of frozen food adjacent the indicator for an interval of time long enough to damage the food, comprising a sheet of absorbent material having plural mutually-spaced recesses in one surface and having temperature indicia graduated successively and printed in the bottoms of the recesses; a series of frozen substantially opaque pellets in the recesses, each pellet having a melting point corresponding with the temperature of the indicia printed in the recess in which that pellet is located; and sizing material homogeneously impregnated in said absorbent material and in sufficient quantity to delay the complete absorbing of a melted pellet into said material for an appreciable interval of time after the pellet melts.

2. In an indicator as set forth in claim 1, each pellet comprising an aqueous solution including a distinctive coloring agent different from the colors of the other pellets of the indicator.

3. In an indicator as set forth in claim 1, each pellet comprising an aqueous solution including a thickening agent to increase the viscosity of the solution when in the liquid phase.

4. In an indicator as set forth in claim 1, said absorbent material comprising a cellulosic material compacted to reduce its porosity.

5. In an indicator as set forth in claim 1, a transparent adhesive strip applied to said surface and covering said recesses and said pellets.

References Cited in the file of this patent

UNITED STATES PATENTS

| | | |
|---|---|---|
| 1,535,536 | MacDonald | Apr. 28, 1925 |
| 1,676,536 | Ferkel | July 10, 1928 |
| 2,379,459 | Schreiber et al. | July 3, 1945 |
| 2,614,430 | Ballard | Oct. 21, 1952 |